– 
United States Patent Office 3,193,401
Patented July 6, 1965

3,193,401
HIGH INDEX GLASS COMPOSITION
Ezra M. Alexander, Jackson, Miss., and Dominick Labino, Grand Rapids, Ohio, assignors to Cataphote Corporation, Toledo, Ohio, a corporation of Ohio
No Drawing. Continuation of application Ser. No. 168,528, Jan. 24, 1962. This application Apr. 23, 1963, Ser. No. 274,941
6 Claims. (Cl. 106—54)

This application constitutes a continuation of application Serial No. 168,528, filed January 24, 1962, and entitled, High Index Glass Composition, which is now abandoned.

This invention relates to novel glass compositions suitable for the manufacture of glass beads in particular, but which are also suitable for the manufacture of various other materials such as flakes, thin plates, and the like.

Glass beads of this invention find particular utility as reflective lens elements which are used in highway marking paints, roadside signs, reflective sheetings, and in general are very useful in connection with any surface that requires illumination by reflection. Reflective brilliance of incident light rays is desired.

It is well known to the art that glass spheres or beads with refractive indices from about 1.85 to 1.95 have excellent reflective properties. It has further been found that optimum brilliance occurs when the lens elements have indices of refraction from about 1.91 to about 1.93.

There are many glass compositions that are commercial that will enable one to obtain the refractive index range sought, e.g., from 1.91 to 1.93. Heretofore, various compositions of glass have contained lead oxide, which was very desirable for many reasons, but the glass beads produced from these glasses were generally light yellow in color, and these beads would discolor further when used in certain industrial areas where sulfides were present in the atmosphere. More recently, compositions have been proposed containing no lead oxide, which are generally useful as reflective lens elements, that can readily be formulated into glass to give the index of refraction desired. These lead-free glasses are substantially crystal clear in color initially, and do not discolor when used in industrial areas where lead oxide containing glasses discolored. However, these glasses, and even the lead containing glasses in some cases, very readily devitrify when produced either from a molten stream of glass or by the crushed glass bead-making technique. It is well known to the art that glasses containing large quantities of barium oxide are very prone to devitrification. It is also well known that titanium dioxide, and other similar oxides, tends to cause devitrification and finds utility as opacifiers in ceramic glazes, tile, et cetera. Devitrification and opacification are detrimental to the manufacture of glass beads suitable for reflective purposes, and such devitrified glass beads have no utility as reflective lens elements.

It is a particular finding of the present invention that glasses containing large quantities of barium oxide, titanium dioxide, and the like, can be so formulated that devitrification and opacification are nil under the conditions of glass bead manufacture. The present invention represents improvement over the present art in that it embodies an appreciable amount of silicon dioxide, the basic constituent of most low index glasses. Incorporation of the silicon dioxide, along with the concomitant reduction in barium oxide and titanium dioxide, in and of itself acts as a glass former, and hence prevents or greatly reduces any devitrification which the still relatively large quantities of barium oxide and titanium dioxide might cause in the glass. The existing compositions generally do not use an appreciable quantity of silicon dioxide largely because it has been commonly thought that the silica when used in conjunction with large quantities of barium oxide or titanium dioxide, would impart a brownish or yellowish color to the glass. We have found that this is not the case, and that when high grade silicon dioxide is used, it does not impart a color to the glass. The use of a substantial quantity of silicon dioxide also completely changes the nature of the glass system, making it essentially a titanium-barium-silica glass, or possibly, a titanium-barium-silica-lime glass. Additionally, silicon dioxide is the best glass former in common use in glass composition systems, and is much superior in yielding a uniform, durable glass than are other typical acidic oxides of the $RO_2$ group or the $R_2O_3$ group, such as boric oxide.

The novel glass compositions of the invention result in great savings to the manufacturer by reducing his loss due to devitrification and opacification, and provide a much improved consumer product inasmuch as, heretofore, it was very difficult, if not highly impractical, to completely eliminate devitrified and opacified glass beads from the commercial beads marketed. These novel compositions are comparative to other present day glass bead formulations in manufacturing costs, and in many cases result in more economical glasses, in addition to the great saving resulting from the lack of devitrified and opacified glass beads.

The new compositions include as their principal constituents titanium dioxide, barium oxide and/or zinc oxide, silicon dioxide, and calcium oxide. Minor ingredients that are found to be useful in these glasses include lithium oxide, sodium oxide, potassium oxide, lithium fluoride, barium fluoride, aluminum oxide, and boric oxide.

Generally, the novel glass compositions are composed of the following: Two or more of the $RO_2$ group oxides, of which titanium dioxide and silicon dioxide are preferred; two or more of the RO group oxides, of which barium oxide, calcium oxide, and zinc oxide are preferred; one or more of the $R_2O$ group oxides, of which sodium oxide, and lithium oxide are preferred; and one or more of the $R_2O_3$ group oxides, of which boric oxide and aluminum oxide are preferred. Additionally, fluorides can be introduced as barium fluoride, calcium fluoride, lithium fluoride, or by other suitable fluorides, to assist in fluxing the glasses.

The oxides used in the glasses of the invention contribute greatly to surface tension, with the exception of boric oxide and potassium oxide. Aluminum oxide has the greatest effect in increasing surface tension. Zinc oxide, lithium oxide, calcium oxide, and barium oxide also contribute appreciably to surface tension, followed closely by silicon dioxide and titanium dioxide.

The surface tension of the molten glass is very important in glass bead manufacture. Without sufficient surface tension at spherulizing temperatures the molten beads will vary from prolate to oblate ellipsoidal shapes instead of the spheroidal shape desired. Therefore, the higher the surface tension of the glass, the more readily it will make useful beads. Indeed, it is the surface tension of the glass alone that makes the molten glass or melted glass fragment form a sphere, hence compositions with relatively high surface tensions are desirable, whereas the lower the surface tension of the glass, the less suited it is for glass bead manufacture. Additionally, the use of aluminum oxide and zinc oxide increases the structural durability of these glasses. Aluminum oxide also acts as a glass former with calcium oxide, which results in a more durable glass structure. Silicon dioxide also acts as a flux for the system, as do zinc oxide, calcium oxide, boric oxide, the alkali metal oxides, and the fluorides. Titanium dioxide has the greatest effect in increasing the refractive index of the glasses, followed closely by lithium oxide, zinc oxide, and barium oxide.

The batch melting must be effected under oxidizing conditions. The furnace atmosphere should contain at least three percent excess oxygen, and the batch materials should preferably contain a minor quantity of extra oxygen, such as may be provided by the use of sodium or barium nitrate, or other suitable materials that contain excess oxygen.

Two typical examples of high index glass compositions in use today are as follows:

|  | Mol percent | Wt. percent |
| --- | --- | --- |
| Typical Example A: | | |
| Titanium dioxide | 43.5 | 32.6 |
| Barium oxide | 38.8 | 55.8 |
| Boric oxide | 17.8 | 11.6 |
| Typical Example B: | | |
| Titanium dioxide | 44.5 | 37.8 |
| Barium oxide | 22.8 | 37.2 |
| Boric oxide | 26.7 | 19.7 |
| Zinc oxide | 6.0 | 5.1 |

The greater the surface tension of the glass, the greater the quantity of perfect spheres that will be produced and the fewer will be rods, dumbbells, fibers and other irregular shapes. Therefore, the glasses of our preferred compositions have a surface tension that is sufficient to decidedly increase the sphericity of the glass beads made from it in comparison with the above typical examples cited. In producing glass beads from a molten stream of glass, a time difference of one-ten-thousandth (.0001) of a second may determine whether true glass spheres or large quantities of irregularly shaped glass particles are produced.

In the manufacture of glass beads, the beads must cool sufficiently to set so that they will not be deformed when they terminate in a collector. However, they must not cool to set prior to reaching their maximum velocity, as when produced directly from a molten stream of glass. Should the glass beads cool to set prior to reaching equilibrium with the surroundings, they will be irregularly shaped. Glass beads made directly from molten glass of Typical Example B require an enormous collecting system so that the beads will have sufficient time to cool and set prior to landing in the collector. Typical Example A has a better cooling rate for glass bead manufacture than does Typical Example B. However, since the surface tension of Typical Example A is somewhat low, the molten glass fragments do not have sufficient opportunity to completely spherulize prior to the time that these beads set. We have found that the combination of surface tension and specific heat in our glasses result in superior beads to those of present day glass bead compositions, of which Example A and Example B are typical. When glass beads manufactured from Typical Example B are made with the use of economical collector systems, the beads do not cool completely prior to impinging on the collector walls or floor. This results in deformation and devitrification. Devitrification and opacification occur when the glass beads settle on a surface and thereby reduce the cooling rate tremendously at the bead-collector surface interface. As a result of extensive experimentation, we have found that the specific heat of the glass from which beads are made should approach about .15 Cal./gm./° C. (after Winkelmann) for optimum results in the manufacture of glass beads directly from molten streams of glass with high surface tensions. Only when the specific heat approximates this value and when the surface tension of the glass is large can all of the mechanisms function properly for the mass production of glass beads.

Table I is a list of useful glass compositions of the invention. Examples No. 5, 10, 13 and 15 are typical and will be used for comparative purposes.

*Table I*

| | | Weight percent | Mol percent |
| --- | --- | --- | --- |
| (1) | $TiO_2$ | 34.0 | 40.1 |
| | BaO | 45.0 | 27.6 |
| | CaO | 4.0 | 6.7 |
| | $Na_2O$ | 1.0 | 1.5 |
| | $SiO_2$ | 13.0 | 20.4 |
| | $B_2O_3$ | 2.0 | 2.7 |
| | ZnO | 0.5 | 0.6 |
| | $Al_2O_3$ | 0.5 | 0.5 |
| (2) | $TiO_2$ | 34.0 | 40.3 |
| | BaO | 44.0 | 27.2 |
| | CaO | 4.0 | 6.8 |
| | $Na_2O$ | 1.0 | 1.5 |
| | $SiO_2$ | 13.0 | 20.5 |
| | $B_2O_3$ | 0.9 | 0.1 |
| | ZnO | 3.1 | 3.6 |
| (3) | $TiO_2$ | 35.5 | 42.5 |
| | BaO | 45.5 | 28.4 |
| | CaO | 4.0 | 6.8 |
| | $Na_2O$ | 1.0 | 1.5 |
| | $SiO_2$ | 13.0 | 20.7 |
| | $B_2O_3$ | 0.9 | 0.1 |
| (4) | $TiO_2$ | 34.6 | 41.5 |
| | BaO | 45.9 | 28.7 |
| | CaO | 4.0 | 6.8 |
| | $Na_2O$ | 1.0 | 1.5 |
| | $SiO_2$ | 13.0 | 20.7 |
| | $B_2O_3$ | 0.9 | 0.1 |
| | ZnO | 0.5 | 0.6 |
| (5) | $TiO_2$ | 34.6 | 41.4 |
| | BaO | 45.4 | 28.3 |
| | CaO | 4.0 | 6.8 |
| | $Na_2O$ | 1.0 | 1.5 |
| | $SiO_2$ | 13.0 | 20.7 |
| | $B_2O_3$ | 0.9 | 0.1 |
| | ZnO | 0.5 | 0.6 |
| | $Al_2O_3$ | 0.5 | 0.5 |
| (6) | $TiO_2$ | 33.6 | 40.2 |
| | BaO | 45.8 | 28.6 |
| | CaO | 4.1 | 7.0 |
| | $Na_2O$ | 1.3 | 2.0 |
| | $SiO_2$ | 13.2 | 21.0 |
| | $B_2O_3$ | 0.9 | 0.1 |
| | ZnO | 0.5 | 0.6 |
| | $Al_2O_3$ | 0.5 | 0.5 |
| (7) | $TiO_2$ | 35.0 | 42.2 |
| | BaO | 46.0 | 28.9 |
| | CaO | 4.0 | 6.9 |
| | $K_2O$ | 1.0 | 1.0 |
| | $SiO_2$ | 13.0 | 20.9 |
| | $B_2O_3$ | 0.9 | 0.1 |
| (8) | $TiO_2$ | 35.5 | 42.7 |
| | BaO | 46.1 | 28.9 |
| | CaO | 4.0 | 6.9 |
| | $SiO_2$ | 13.4 | 21.4 |
| | $B_2O_3$ | 0.9 | 0.1 |
| (9) | $TiO_2$ | 36.4 | 42.4 |
| | BaO | 44.1 | 26.8 |
| | $SiO_2$ | 13.1 | 20.3 |
| | $B_2O_3$ | 0.9 | 0.1 |
| | LiF | 0.9 | 3.2 |
| | CaO | 4.3 | 7.1 |
| (10) | $TiO_2$ | 37.0 | 44.8 |
| | BaO | 44.1 | 27.8 |
| | $SiO_2$ | 8.2 | 13.2 |
| | $Al_2O_3$ | 2.4 | 2.3 |
| | CaO | 3.5 | 6.0 |
| | $B_2O_3$ | 2.8 | 3.9 |
| | $Na_2O$ | 0.4 | 0.6 |
| | $BaF_2$ | 1.3 | 0.7 |
| | ZnO | 0.2 | 0.2 |
| | $Li_2O$ | 0.1 | 0.3 |
| (11) | $TiO_2$ | 33.5 | 38.5 |
| | BaO | 40.0 | 24.0 |
| | CaO | 4.0 | 6.6 |
| | $Na_2O$ | 1.0 | 1.5 |
| | $SiO_2$ | 11.5 | 17.6 |
| | $B_2O_3$ | 3.0 | 4.0 |
| | ZnO | 7.0 | 7.9 |
| (12) | $TiO_2$ | 32.5 | 37.2 |
| | BaO | 40.0 | 23.8 |
| | CaO | 4.0 | 6.5 |
| | $Na_2O$ | 2.5 | 3.7 |
| | $SiO_2$ | 13.0 | 19.8 |
| | ZnO | 8.0 | 9.0 |

Table I—Continued

| | | Weight percent | Mol percent |
|---|---|---|---|
| (13) | $TiO_2$ | 34.0 | 40.4 |
| | BaO | 40.0 | 24.7 |
| | CaO | 4.0 | 6.8 |
| | $Na_2O$ | 1.0 | 1.5 |
| | $SiO_2$ | 8.0 | 12.6 |
| | $Al_2O_3$ | 5.0 | 4.7 |
| | ZnO | 8.0 | 9.3 |
| (14) | $TiO_2$ | 33.5 | 38.8 |
| | BaO | 40.0 | 24.1 |
| | CaO | 4.0 | 6.6 |
| | $Na_2O$ | 1.6 | 2.4 |
| | $SiO_2$ | 13.0 | 20.0 |
| | $B_2O_3$ | 0.9 | 0.1 |
| | ZnO | 7.0 | 8.0 |
| (15) | $TiO_2$ | 33.0 | 38.0 |
| | BaO | 40.0 | 24.0 |
| | CaO | 4.0 | 6.6 |
| | $Na_2O$ | 1.6 | 2.4 |
| | $SiO_2$ | 13.0 | 19.9 |
| | $B_2O_3$ | 0.4 | 0.05 |
| | ZnO | 8.0 | 9.0 |
| (16) | $TiO_2$ | 37.0 | 40.3 |
| | BaO | 30.5 | 17.3 |
| | CaO | 4.0 | 6.2 |
| | $Na_2O$ | 2.5 | 3.5 |
| | ZnO | 13.0 | 13.9 |
| | $SiO_2$ | 13.0 | 18.8 |
| (17) | $TiO_2$ | 34.0 | 38.1 |
| | BaO | 35.5 | 20.7 |
| | CaO | 4.0 | 6.4 |
| | $Na_2O$ | 2.0 | 2.9 |
| | ZnO | 12.0 | 13.2 |
| | $SiO_2$ | 12.5 | 18.6 |
| (18) | $TiO_2$ | 33.5 | 40.2 |
| | BaO | 46.2 | 28.9 |
| | CaO | 4.0 | 6.8 |
| | $Na_2O$ | 1.0 | 1.5 |
| | $SiO_2$ | 13.4 | 21.4 |
| | $B_2O_3$ | 0.9 | 0.1 |
| | ZnO | 0.5 | 0.6 |
| | $Al_2O_3$ | 0.5 | 0.5 |
| (19) | $TiO_2$ | 32.5 | 39.4 |
| | BaO | 47.6 | 30.0 |
| | CaO | 4.0 | 6.9 |
| | $Na_2O$ | 1.0 | 1.6 |
| | $SiO_2$ | 13.0 | 20.9 |
| | $B_2O_3$ | 0.9 | 0.1 |
| | ZnO | 0.5 | 0.6 |
| | $Al_2O_3$ | 0.5 | 0.5 |
| (20) | $TiO_2$ | 34.3 | 41.0 |
| | BaO | 45.3 | 28.2 |
| | CaO | 4.0 | 6.8 |
| | $Na_2O$ | 1.3 | 2.0 |
| | $SiO_2$ | 13.1 | 20.8 |
| | $B_2O_3$ | 0.9 | 0.1 |
| | ZnO | 0.5 | 0.6 |
| | $Al_2O_3$ | 0.5 | 0.5 |

Table II is a comparison of typical Examples A and B above and the examples of compositions of the invention as indicated above, with respect to specific heat.

Table II

| | Specific heat (Cal./gm./° C.) [1] |
|---|---|
| Typical Example A | .1414 |
| Typical Example B | .1608 |
| Our Typical Example No. 5 from Table I | .1471 |
| Our Typical Example No. 10 from Table I | .1486 |
| Our Typical Example No. 13 from Table I | .1467 |
| Our Typical Example No. 15 from Table I | .1481 |

[1] According to Winkelmann.

A similar comparison of the examples of Table II with respect to surface tension is given in Table III.

Table III

| | Dynes/cm. 900° C. (after Dietzel) |
|---|---|
| Typical Example A | 314.0 |
| Typical Example B | 291.0 |
| Our Typical Example No. 5 in Table I | 342.4 |
| Our Typical Example No. 10 in Table I | 341.5 |
| Our Typical Example No. 13 in Table I | 366.5 |
| Our Typical Example No. 15 in Table I | 350.8 |

The glass compositions of the invention illustrated by the foregoing specific examples consist essentially of from about 32% to about 37% by weight of $TiO_2$, from about 30% to about 48% by weight of at least one oxide selected from the group consisting of BaO and ZnO not less than about 30% being BaO, from about 3.5% to about 4.5% of at least one oxide selected from the group consisting of CaO and MgO, from 0 to about 2.5% of at least one oxide selected from the group consisting of $Na_2O$, $K_2O$ and $Li_2O$, and from about 12% to about 21.0% by weight of at least one oxide selected from the group consisting of $SiO_2$, $Al_2O_3$ and $B_2O_3$ not less than about 8% being $SiO_2$. These compositions may advantageously include minor amounts, of the order of 0.5 to 1.5% by weight, of alkali metal or alkaline earth metal fluorides.

The glass compositions of the invention may be prepared by melting a mix of the batch components in a conventional glass furnace made of conventional heat resistant refractories free from deleterious contaminating material, particularly iron. The batch is composed of oxides or compounds decomposable to oxides under the conditions of melting, except for such fluorides as may be incorporated, in the proper proportion to yield the specified compositions. In general titanium, zinc and aluminum are added as oxides; barium, calcium and sodium may conveniently be added as carbonates; silica may be added as high grade quartz sand and boron may be added as boric acid or as borax.

The glass compositions of the invention melt at temperatures within the range of 1110–1400° C. The batch mix is preferably added to the furnace continuously, or in successive increments allowing each increment to melt before the next increment is added, until the glass melt is brought to the desired level which may require from 4 to 10 hours.

After the melt has been prepared, it can be converted to glass beads by conventional methods, either directly from the melt or by pouring a stream of the molten glass into water to form a cullet, particles of which are blown or dropped through a high temperature flame or a radiant heating zone to soften them sufficiently to form spheres by the action of surface tension followed by rapid cooling to harden the spheres without devitrification.

Thin plates and flakes of the glass can be made by casting a thin layer of the glass on a cold steel surface.

What is claimed is:

1. A glass composition consisting essentially of from about 32% to about 37% by weight of $TiO_2$ from about 30% to about 48% by weight of at least one oxide selected from the group consisting of BaO and ZnO not less than about 30% being BaO, from about 3.5% to about 4.5% of at least one oxide selected from the group consisting of CaO and MgO, from 0 to about 2.5% of at least one oxide selected from the group consisting of $Na_2O$, $K_2O$ and $Li_2O$, and from about 12% to about 21.0% by weight of at least one oxide selected from the group consisting of $SiO_2$, $Al_2O_3$ and $B_2O_3$ not less than about 8% being $SiO_2$.

2. A glass composition as defined in claim 1 consisting essentially of about 34.6% by weight of $TiO_2$, about 45.4% by weight of BaO, about 4% by weight of CaO, about 1% by weight of $Na_2O$, about 13% by weight of $SiO_2$ about 0.9% by weight of $B_2O_3$, about 0.5% by weight of ZnO and about 0.5% by weight of $Al_2O_3$.

3. A glass composition as defined in claim 1 consisting essentially of about 36.4% by weight of $TiO_2$, about 44.1% by weight of BaO, about 13.1% by weight of $SiO_2$ about 0.9% by weight of $B_2O_3$, about 0.9% by weight of LiF, and about 4.3% by weight of CaO.

4. A glass composition as defined in claim 1 consisting essentially of about 37% by weight of $TiO_2$, about 44.1% by weight of BaO, about 8.2% by weight of $SiO_2$, about 2.4% by weight of $Al_2O_3$, about 3.5% by weight of CaO, about 2.8% by weight of $B_2O_3$, about 0.4% by weight of $Na_2O$, about 1.3% by weight of $BaF_2$, about 0.2% by weight of ZnO and about 0.1% by weight of Li$_2$O.

5. A glass composition as defined in claim 1 consisting essentially of about 34% by weight of TiO$_2$, about 40% by weight of BaO, about 4% by weight of CaO, about 1% by weight of Na$_2$O, about 8% by weight of SiO$_2$, about 5% by weight of Al$_2$O$_3$ and about 8% by weight of ZnO.

6. A glass composition as defined in claim 1 consisting essentially of about 37% by weight of TiO$_2$, 30.5% by weight of BaO, about 4% by weight of CaO, about 2.5% by weight of Na$_2$O, about 13% by weight of ZnO and about 13% by weight of SiO$_2$.

References Cited by the Examiner
UNITED STATES PATENTS

| | | | |
|---|---|---|---|
| 2,961,563 | 11/60 | Peras | 106—54 |
| 3,041,191 | 6/62 | D'Adrian | 106—47 |
| 3,107,178 | 10/63 | Rindone | 106—47 |
| 3,145,114 | 8/64 | Rindone | 106—47 |

TOBIAS E. LEVOW, *Primary Examiner.*